United States Patent [19]

Dzedzej et al.

[11] Patent Number: 4,938,818
[45] Date of Patent: Jul. 3, 1990

[54] METHOD OF FORMING A SEAL

[75] Inventors: Henry S. Dzedzej, Media; Richard F. DeRosa, Newtown Square; Carl B. Schartner, Wallingford, all of Pa.

[73] Assignee: Teledyne Industries, Inc., Chester, Pa.

[21] Appl. No.: 290,475

[22] Filed: Dec. 29, 1988

[51] Int. Cl.$^5$ .................... B32B 31/20; B32B 51/28
[52] U.S. Cl. .................... 156/69; 156/274.4; 156/274.6; 156/285; 156/308.4; 156/309.6; 219/10.43
[58] Field of Search .............. 156/69, 156, 272.4, 156/273.3, 273.5, 274.4, 274.8, 275.1, 285, 303.1, 308.2, 308.4, 309.6, 282, 311, 379.7, 379.8, 379.9, 380.2, 382, 498, 499, 510, 250, 556, 274.6; 219/10.79, 10.53, 10.43, 10.49 R; 53/428, 317, 485

[56] References Cited

U.S. PATENT DOCUMENTS

| | | | |
|---|---|---|---|
| 2,322,885 | 6/1943 | Rogers | 156/311 |
| 3,102,182 | 8/1963 | Oelze | 156/498 |
| 3,231,444 | 1/1966 | Shick | 156/498 |
| 3,239,397 | 3/1966 | Hoyle | 156/311 |
| 3,773,205 | 11/1973 | Keeler et al. | |
| 3,909,326 | 9/1975 | Renck | 156/272.4 |
| 3,928,109 | 12/1975 | Pollock | 156/272.4 |
| 3,988,185 | 10/1976 | Johnson | 156/272.4 |
| 4,094,460 | 7/1978 | Scanga et al. | |
| 4,171,084 | 10/1979 | Smith | |
| 4,442,129 | 4/1984 | Niwa et al. | |
| 4,595,434 | 6/1986 | Eckstein et al. | 222/91 |
| 4,605,136 | 8/1986 | Debentencourt | 215/232 |
| 4,660,732 | 4/1987 | Moore | 215/232 |
| 4,681,645 | 7/1987 | Fukushima et al. | |
| 4,750,642 | 6/1988 | Eckstein | 156/69 |
| 4,771,903 | 9/1988 | Levene | 156/69 |

Primary Examiner—Merrell C. Cashion, Jr.
Attorney, Agent, or Firm—Eugene Chovanes

[57] ABSTRACT

The present invention is for a method of forming a seal in a prior art collapsible tube assembled in a prior art manner. A laminate seal is cut, positioned and held, and welded to the dispensing orifice of a rigid plastic head after the head is molded, but before it is assembled to the tube wall. The seal is protected during the welding of the wall to the head by the use of a heat sink.

2 Claims, 3 Drawing Sheets

METHOD OF FORMING A SEAL

BACKGROUND OF THE INVENTION

1. Technical Field

This invention relates generally to collapsible tubes used to contain and dispense fluids, and particularly to a method of forming a seal of laminated material on the dispensing orifice of a prior art tube formed of a collapsible tube wall of laminate material welded to a plastic head portion.

Collapsible tubes are packages in tube form having a dispensing orifice at one end of a deformable tube. The tube is deformed and collapsed by squeezing so that the contents are forced out the orifice. Such tubes are used to contain toothpaste, pharmaceuticals, cosmetics, personal care products, artists' pigments, adhesives, sealants and caulking materials, greases and lubricants, foods and condiments, and many other products. Collapsible tubes generally have a screw cap closure.

Such tubes are made of metal such as lead, tin and aluminum, and more recently of plastic and laminate materials.

Prior art collapsible tubes, particularly those of metal, often have a seal across the mouth of the tube. Such seals are generally used on medicinal products. The seal is pierced and deformed against the interior of the dispensing orifice before the contents are discharged. An unbroken seal assures the user that the product has not been tampered with or otherwise contaminated.

The seal also prevents the tube contents from leaking out prior to use. Also, the seal prevents any atmospheric contact with the tube contents, since the tube is sealed in an air-tight manner.

In use, the seal is pierced by, for instance, a point formed in the tube screw cap.

This invention is specifically directed to the method of forming a seal of laminate on the dispensing orifice of a prior art collapsible tube, wherein such tube has a rigid plastic head welded to a collapsible tube wall of a laminate material. Such laminate includes layers of plastic and metal foil.

BACKGROUND INFORMATION

Prior Art Collapsible Tubes

Collapsible tubes are formed of (1) metal alone, or (2) plastic alone, or (3) a combination of a rigid plastic head portion and a deformable laminate tube body portion.

Method of Making Prior Art Collapsible Tubes

Metal tubes are formed by impact extrusion from metal slugs in a die caviaty wherein a ram forces the metal into the tube shape.

Plastic tubes of, for instance, polyethylene are injection molded into the desired tube shapes.

Laminate tubes consist of at least two parts; namely, (1) a rigid pure plastic head portion, and (2) a tube body formed of a laminate of layers of plastic and metal foil, adhesively held together. The tube body is joined, in a separate step, to the molded plastic head by for instance radio frequency welding.

The tubes are filled through an open bottom. The tubes are then closed at the bottom, generally by a fold.

Prior Art Seals on Collapsible Tubes

Prior art collapsible tubes, particularly those formed of metal, often have a seal across the dispensing orifice of the tube. Seals are generally used when the tube contains medicinal products. The seal is pierced and deformed before the contents are discharged. An unbroken seal assures the user that the product has not been tampered with or otherwise contaminated. In use, the seal is pierced by, for instance, a point formed in the tube screw cap. It is highly desirable that the seal, once broken by the user, remains in a fixed, open position so that the contents can be easily squeezed from the tube.

Metal foil seals work extremely well, since they stay deformed, once pierced. Pure plastic seals are far less desirable since they spring back after being perforated and block flow from the tube. Also, plastic tubes, in which plastic seals are easily formed, spring back after being squeezed and suck air back into the tube. The plastic tube does not stay deformed to shrink with the contents as does a metal tube.

Laminate tubes having rigid plastic heads welded to collapsible tube walls formed of a laminate of metal and plastic deform relatively well. Forming a seal of other than pure plastic, which is unsatisfactory on such tubes, however, is a problem. The tube dispensing orifice is in a head formed of a pure plastic, whereas the deformable tube body is made of a laminate which must be welded to the head portion having the dispensing orifice therein, in a separate step, to assemble the tube components.

Methods of Forming Prior Art Seals

Prior art seals have been formed in different ways, depending upon the material from which the tube is made.

In a metal collapsible tube, a metal foil seal can be readily formed integral with the neck, across the mouth of the tube, by simply suitably designing the die cavity. The ram, in extruding the tube within the cavity, forms the integral metal seal. The seal is punctured prior to use and stays in its punctured position.

A seal can also be formed integral with the tube of pure plastic during the molding operation, wherein the entire tube is formed at one time. Plastic tubes lack the ability to shrink with the contents as the tube is used, since the springy plastic material holds its shape and sucks air into the package when hand pressure is removed. The plastic seal likewise is springy and does not retain its punctured condition, but rather springs back to block easy dispension of the contents.

Collapsible tubes called laminate tubes are formed of a laminate wall welded to a plastic head. The walls of such a tube do not spring back as do the pure plastic tubes. In contrast to metal tubes and pure plastic tubes which are formed in one piece in an extrusion or molding, laminate tubes are formed of individual parts assembled together. A head portion is injection molded of pure thermoplastic. A tube body of laminate is separately formed. The parts are then welded together. Since the head portions of the laminate tubes are of pure plastic and are molded, it is possible to mold a pure plastic seal in the mouth of the tube. As explained above, such pure plastic seal is unacceptable since, after piercing, it does not stay out of the way of discharge of the contents, but springs back to continue to form an obstacle across the tube mouth.

It is therefore necessary, in a laminate tube, to form a seal of a deformable material, such as a laminate, which can be welded to the laminate tube dispensing orifice in the head, which is formed of rigid plastic.

Problems arise in securing a seal of laminate to the dispensing orifice of the plastic head of a laminate tube in that the seal must be formed, positioned and held and then welded to the head as by heat sealing or radio frequency welding. In the prior art, as disclosed in U.S. Pat. No. 4,595,434, a seal of laminate material is secured to the dispensing orifice of a laminate tube after the laminate tube has been welded to the rigid plastic head portion. The seal of laminate is cut to the finished dimension and placed within a screw cap closure of rigid plastic. The cap is then screwed on the neck of the tube over the dispensing orifice to hold the seal in position for welding by radio frequency. A ferrite mandrel is used within the tube dispensing orifice to prevent damage to the weld between the wall and the head.

A problem with such method is that the seal cannot be visually inspected after completion without unscrewing the cap. A further problem is that the sealing operation takes place after the wall has been assembled to the head, so that extreme care must be taken that the shoulder weld between the rigid plastic head portion and the laminate wall portion is not damaged by the radio waves used to apply the seal. Additionally, it is cumbersome to cut and place a laminate seal in the head of a cap.

Considering that tubes are made on a mass basis with repetitive machine operations, these problems in the prior art represent a burden during the manufacturing process.

SUMMARY OF THE INVENTION

Prior art laminate tubes are formed of an injection molded solid thermoplastic head portion having an integral shoulder and neck, with a dispensing orifice therein, welded to a tube formed of a laminated wall. The wall has layers of metal foil, thermoplastic, and sometimes paper.

In the present invention, a seal of laminate material is cut, positioned on the head dispensing orifice and held thereto, and then heat-sealed by a hot press to the orifice before the head is welded to the laminate tube wall. When the tube wall is subsequently assembled and welded by radio frequency to the head, a special heat sink is positioned adjacent the seal to avoid damage to the seal.

The laminate material from which the seal is made is in web form and positioned across the head dispensing orifice. A seal is die cut from the web right over the orifice, whereupon it is held securely thereto by a vacuum applied through the bottom of the head through the orifice. A heat press is applied to the seal over the orifice and the thermoplastic layer in the seal laminate, which is adjacent to the thermoplastic lip of the dispensing orifice, melts the thermoplastic at the contact interface, after which the press is removed. The weld then cools, hardens, and fuses the seal to the outlet.

The head is then assembled with the tube wall, which has been preformed in prior art fashion. In forming the tube wall, a continuous web of material is formed into a continuous tube and then welded as by radio frequency along the longitudinal seam. The continuous tube so formed is then cut into lengths corresponding to the collapsible tube lengths.

The tube lengths are then assembled individually on a mandrel and brought into position adjacent the tube heads and welded thereto by radio frequency waves.

A special heat sink is placed adjacent the seal to absorb heat generated by the weld operation, so there is no heat buildup in the laminate seal, which contains a metal foil layer.

In summary, the present invention is for a method of forming a seal in a prior art collapsible tube assembled in a prior art manner. A laminate seal is cut, positioned and held, and welded to the dispensing orifice of a rigid plastic head after the head is molded, but before it is assembled to the tube wall. The seal is protected during the welding of the wall to the head by the use of a heat sink.

DESCRIPTION OF THE PREFERRED EMBODIMENT

Prior Art Laminate Tube and Seal

Figure 11:
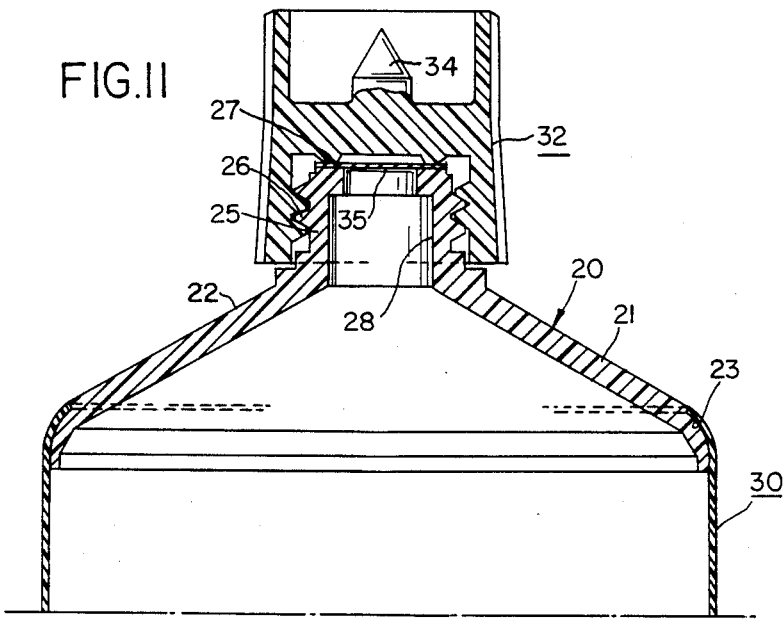
FIG. 11 is a vertical sectional elevational view of a tube made in accordance with the invention, taken on the line 11—11 of FIG. 10.
Figure 6:
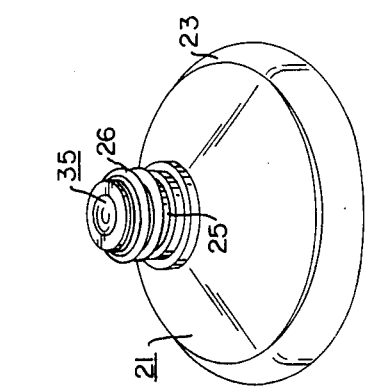
FIG. 6 is a perspective view of the head portion, similar to FIG. 4, with a seal secured at the mouth.
Figure 5:
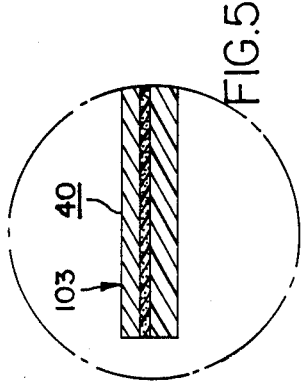
FIG. 5 is an enlarged view of the seal material circled in FIG. 3.
Figure 4:
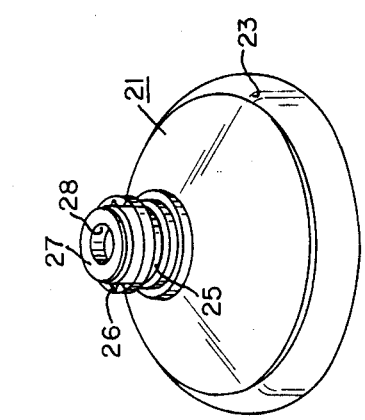
FIG. 4 is a perspective view of the head portion of a laminate tube, to which a seal is applied, as shown in FIG. 3.
Figure 10:
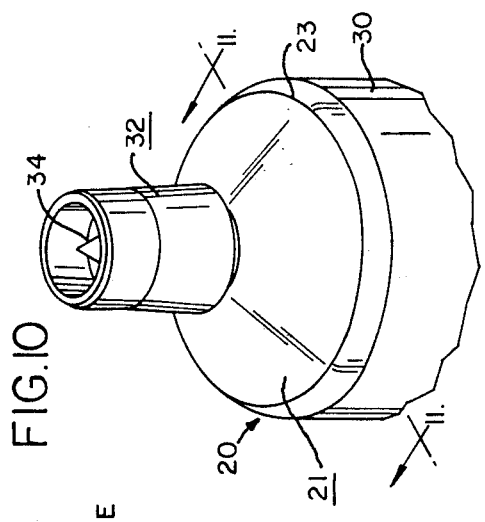
FIG. 10 is a perspective upper fragmentary view of an assembled tube with a closure cap secured thereon.

As seen particularly in FIGS. 10 and 11, a laminate tube 20 has a rigid molded thermoplastic head 21 having a downwardly, outwardly sloping shoulder 22. Shoulder 22 has at its outer circumference a recessed ridge 23 as seen for instance in FIGS. 4 and 6. The head 21 is generally in the form of a concave disk and has at its center a neck 25 having integral screw threads 26 thereon. The neck 25 terminates at lip 27.

A dispensing orifice 28 extends through the neck 25. Head 21 is mass-produced by injection molding, in one piece, in a well known prior art manner from a suitable thermoplastic such as polyethylene.

Figure 9:
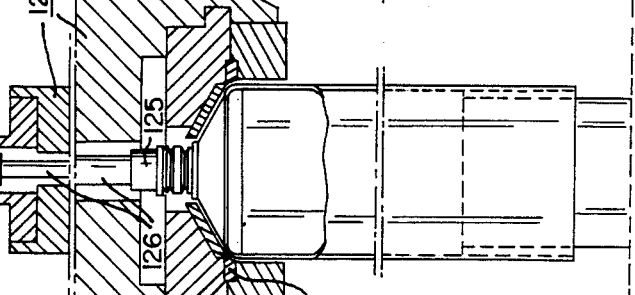
FIG. 9 is an enlarged sectional view of the tube wall encircled in FIG. 8.
Figure 9:
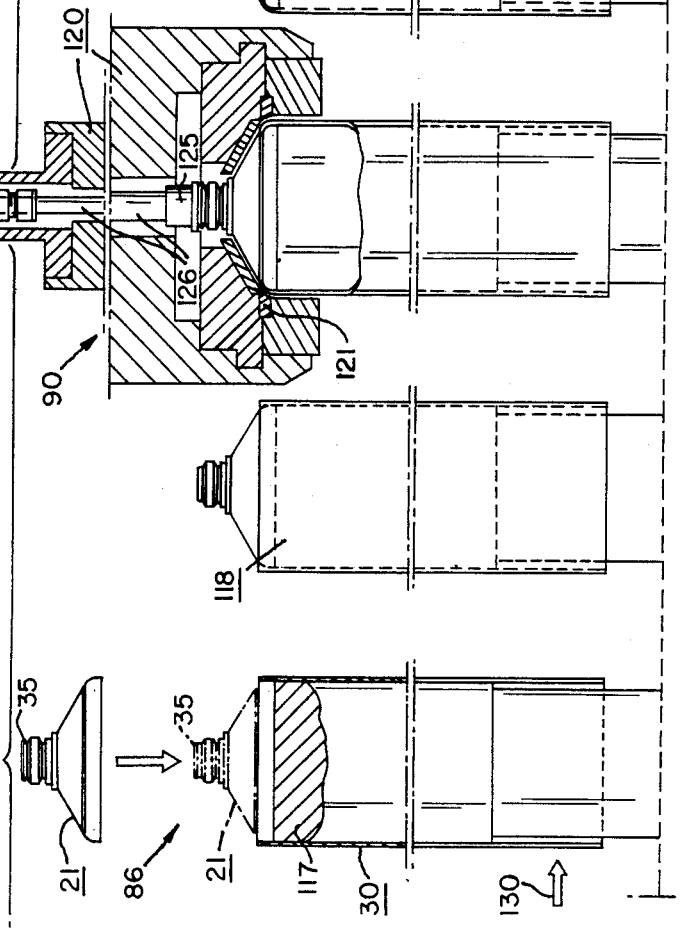
Figure 8:
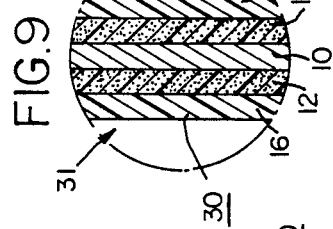
FIG. 8 is a partial perspective view of the tube wall, with a portion of the wall broken away.

Head 21 is welded to tube wall 30 which is composed of a laminate 31 as seen in FIGS. 8 and 9. Such a typical laminate can be for instance 310 microns in thickness, and can have a central metal foil 10 of aluminum 40 microns thick, adjacent layers of special polyolefine 12, the inner adjacent layer of a 40 micron thickness and the outer adjacent layer being white pigmented and of a 70 micron thickness, an inner layer of medium density transparent polyolefine film 14 and an outer layer 16 of transparent polyolefine film 90 microns in thickness. The layers 10, 12, 14 and 16 are all suitably bonded together to form the laminate 31 from which the tube wall 30 is formed. Such laminate material is well known in the prior art, and is sold by various manufacturers to firms that make collapsible laminate tubes. Also specific examples are set forth in detail in U.S. Pat. No. 4,595,434.

The tube body 30 is formed by taking an endless web of laminate and suitably curving the web into an endless cylinder that passes through a welding station which welds the longitudinal seam, as by radio frequency. The endless tube is then continuously chopped into lengths corresponding to the continuous tube body.

A screw cap 32 is threaded onto threads 26 on neck 25.

Method of Forming Prior Art Seal Laminate

In some instance, such prior art laminate tubes had a seal 35 secured to the lips 27 of the dispensing orifice 28 as seen particularly in FIG. 11. The seal consisted of a laminate of plastic and metal layers similar to the material of the laminate side wall, except generally three layers, including a metal foil layer and layers of plastic, were used. For instance, such a laminate can consist of an outer metal foil, an intermediate polymer adhesive layer, and an inner polyethylene layer.

Figure 1:
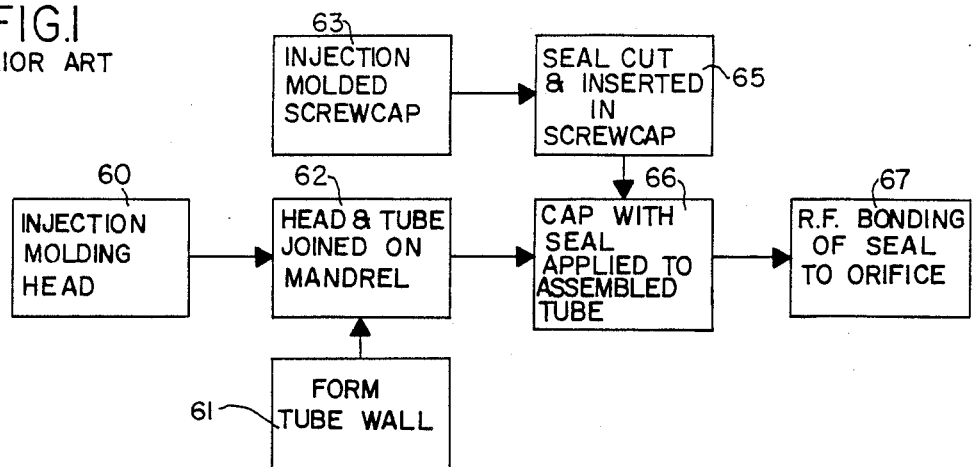
FIG. 1 is a block diagram of a prior art method of forming a seal on a laminate tube.

The seal was secured to the tube by the method shown in FIG. 1. Such method is that taught in U.S. Pat. No. 4,595,434.

As seen in FIG. 1, the head 21 was injection molded of pure plastic at station 60 in the process. A tube wall 30 was formed at another station 61.

The tube wall 30 and head 21 were joined on a mandrel at station 62 and the wall 30 welded to the head 21 at 23 by radio frequency waves.

At still another station 63, a screw cap was injection molded after which a seal 35 of laminate conforming in size to the inner opening of the screw cap was cut, and placed and held within the screw cap at station 65.

At station 66, the screw cap with seal 35 therein was threaded onto assembled tube 20 having wall 30 already welded to head 21 at 23. When the screw cap was full threaded, seal 35 was positioned over dispensing orifice 28 and held against lip 27.

At station 67, a ferrite mandrel was placed within orifice neck 28, and the seal 35 radio frequency welded, through the screw cap to orifice 28.

The sealed tube with cap thereon was then ready to receive the contents through the bottom opening, after which the bottom was sealed.

In use, the screw cap 32 often had a point 34 molded therein, which was used to pierce seal 35, deforming the seal to open up dispensing orifice 28.

The Present Invention

Figure 2:
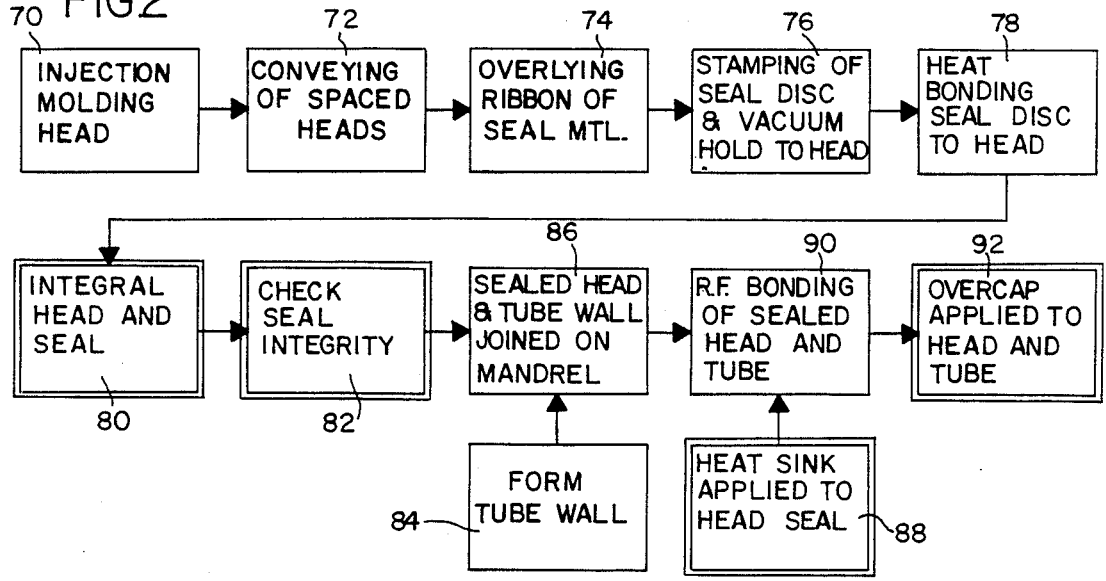
FIG. 2 is a block diagram showing the method of the invention of forming a seal on a laminate tube.
Figure 3:
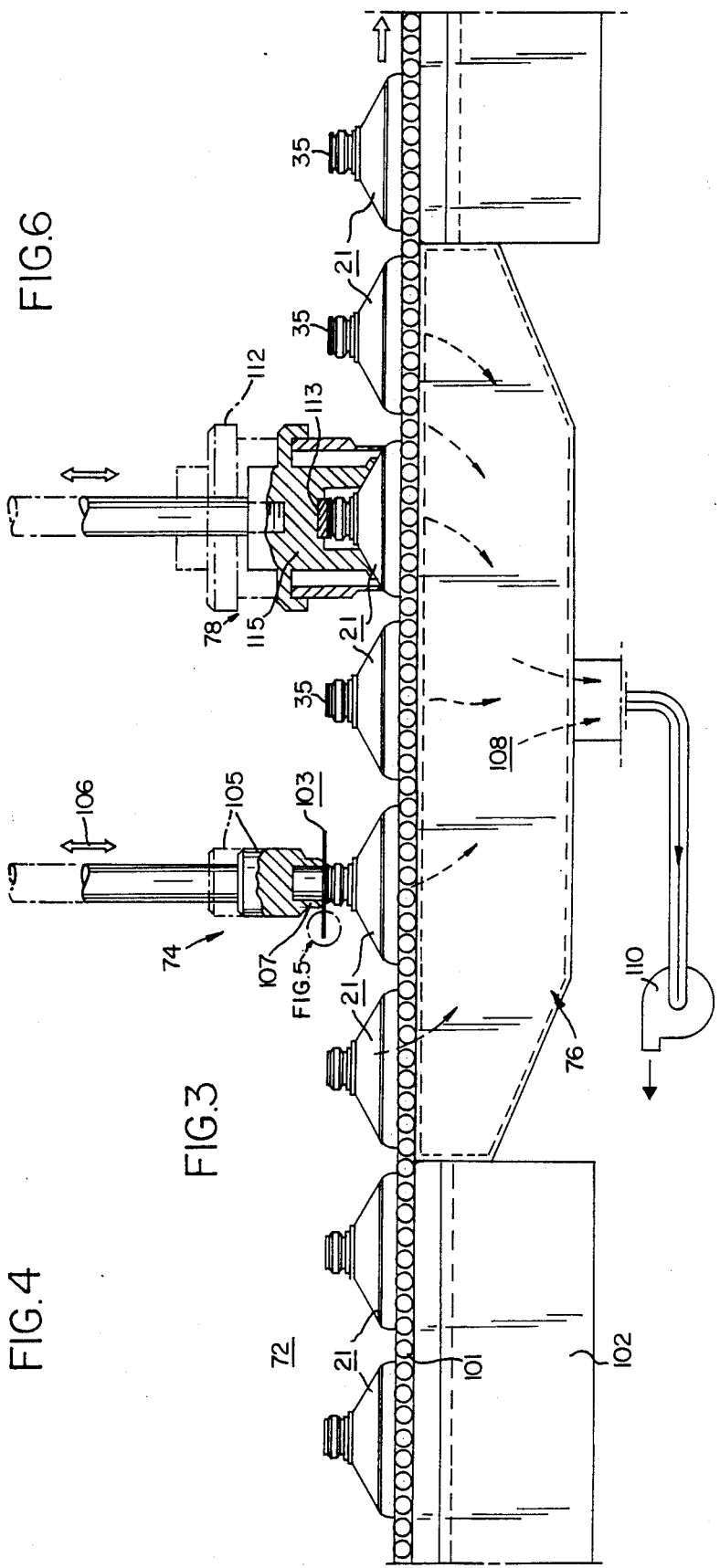
FIG. 3 is a vertical side view, partially in section, of an assembly line, wherein the seal is applied to the head portion of the tube.

Thermoplastic heads 21 are injection molded at station 70 in FIG. 2, as in the prior art, and moved continuously in a file, neck up, at station 72 as seen in block diagram of FIG. 2 and the schematic diagram of FIG. 3. A driven track 101 supported on base 102 carries head 21 to a station 74 where a continuous ribbon or web 103 of laminate 40 extends transversely to track 101. Ribbon 103 moves intermittently to provide a fresh portion above head 21 adjacent lip 27 of orifice 28. Both track 101 and ribbon 103 stop momentarily during a power driven die cutter 105, reciprocating vertically as shown at 106, and having a hollow circular die 107, cuts a circular seal 35 over dispensing orifice 28 on lips 27. The seal 35 is held in position over the orifice on the lips by a vacuum created in chamber 108 extending beneath track 101 by vacuum pump 110. This is shown in the block diagram of FIG. 2 at 76. The chamber vacuum is applied beneath head 21 through shoulder 22 to dispensing orifice 28 hold seal 35 in place.

Die cutting 105 reciprocates upwardly; and both track 101 and ribbon 103 move. Track 101 carries head 21 to station 78, where a reciprocating hot press 112 having a heated platen 113 within a body 115 moves downwardly against the head 21. Heated platen 113, for instance at a temperature of 300° F., is held against seal 35 momentarily to fuse laminate 40, of which seal 35 is formed, to the lips 27 of plastic head 21.

Hot press 112 then moves upwardly whereupon the weld between seal 35 and lips 27 cools, forming an adhesive bond.

Track 101 then continues its intermittent movement. The movements of track 101, web 103, die cutter 105, and press 112 are all coordinated.

The seal 35, now bonded to head 21, as indicated at 80, can now be inspected as indicated at station 82, in the block diagram of FIG. 2.

A tube wall 30 is formed at station 84, as in the prior art.

Figure 7:
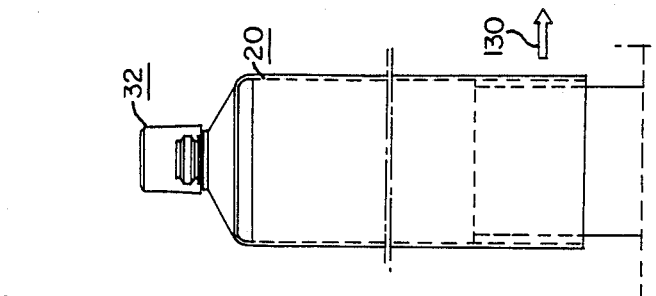
FIG. 7 is a schematic side elevational view of the various successive steps in the assembly of the tube.
Figure 7:
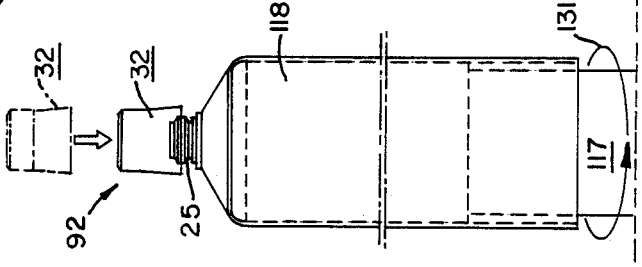
Figure 7:
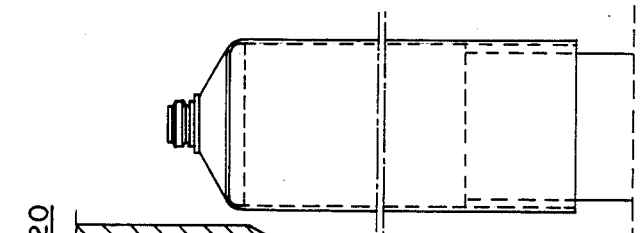
Figure 7:
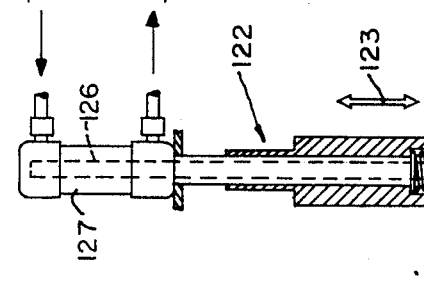

The head 21 with seal 35 bonded thereto, and tube wall 30 are then assembled on a mandrel at station 86 as seen particularly in FIG. 7. The assembly 118 travels to station 90 where the wall 30 is bonded at 23 to head 21 by radio frequency waves.

At station 90, a reciprocating radio frequency collar 120 having a weld ring 121 is brought into contact with assembly 118, wherein tube wall 30 is welded at 23 to head 21 in a well known prior art manner. To protect seal 35 against damage from the heat generated by radio waves emitting from weld ring 121, and impinging against seal 35 wherein there is a heat buildup, a heat sink 122 is used.

The heat sink 122 is applied to seal 35 as indicated at 88 in FIG. 2, during the bonding of the wall 23 to the head 21 as indicated at 90 in FIGS. 2 and 7.

Heat sink 122 reciprocates vertically as indicated at 123 wherein a contact head 125 is brought against seal 35 when the radio frequency waves are being emitted. The head 125 is connected by a gas filled tube 126 to a heat exchange chamber 127. The gas within tube 126 is one with a high heat conductivity. A liquid coolant, for instance, water, is passed through the chamber to conduct heat from the gas tube 126.

The heat sink 122 as described is a known prior art device.

Radio frequency weld collar 120 and heat sink 122 are interconnected so that they reciprocate in unison to perform the indicated operation.

Tube assemblies 118 are intermittently moved in a direction as indicated at 130, through station 90 to station 92 where cap 32 is applied. Mandrel 117, with completed tube assembly 118 thereon is rotated as at 131 to in effect thread the neck 25 onto the cap 32.

The completed tube 20, with cap secured thereon, is then ready for filling with the intended tube contents.

I claim:
1. In a method of making a collapsible tube having a separately made rigid plastic head portion with a dispensing orifice therein, and separately made tube body of a laminate of plastic and metal foil, wherein the heat and tube body are welded together with radio frequency waves,
   the improvement comprising
      the method of forming a seal of a laminate of plastic and metal across the dispensing orifice of the tube, comprising

(1) applying the seal to the dispensing orifice of the head before the head is welded to the tube body by
  (a) moving a file of heads past a first station;
  (b) stopping each head intermittently at the first station;
  (c) continuously applying a vacuum to the head and dispensing orifice from below the head at the first station;
  (d) passing a web of laminate over the head adjacent the dispensing orifice at the first station;
  (e) cutting a seal from the web of laminate adjacent the dispensing orifice;
  (f) keeping the seal of laminate positioned on the head over the dispensing orifice by means of the vacuum;
  (g) applying a hot press to the seal to fuse the seal to the head; and
  (h) terminating the vacuum below the head to the dispensing orifice, and
(2) inserting a heat sink adjacent the seal during the welding by radio frequency waves of the head to the tube body, whereby any buildup of heat in the laminate seal is dissipated away from the seal to prevent damage to the seal.

2. The method of claim 1 wherein the step of applying the hot press occurs at a second station.

* * * * *